April 16, 1929.  H. M. BAKER  1,709,600
CAMERA COPY AND METHOD OF AND MEDIUM FOR MAKING THE SAME
Filed Aug. 25, 1927

Witness
C. C. Holly

Inventor
Henry M. Baker
by James R. Townsend
his atty

Patented Apr. 16, 1929.

1,709,600

UNITED STATES PATENT OFFICE.

HENRY M. BAKER, OF LOS ANGELES, CALIFORNIA.

CAMERA COPY, AND METHOD OF, AND MEDIUM FOR MAKING THE SAME.

Application filed August 25, 1927. Serial No. 215,444.

This invention and discovery relates to copy to be used for negatives in process reproduction for lithography, photoengraving, rotogravure offset press and like work in which it is required or desirable that back-ground or other shading or designs or parts of the same shall accompany a pen and ink, crayon, pencil, brush, air brush or other superficial drawing.

This invention is broadly new, basic and pioneer in that it comprises camera copy consisting in a surface containing an impregnating image partly visible and partly invisible, and a visible superfical image, the visible impregnating image being a redevelopment of part or parts of the invisible impregnating image and combining with the visible superficial drawing to constitute the copy from which outlined combination, high lighted, half-tone and line negatives can be produced in one negative at a single exposure.

An object is to produce a double printed effect from a single surface of camera copy with a single negative at one exposure.

The invention also includes the medium for making camera copy which consists in a blanched surface impregnated with an image invisible to the eye and to the camera and adapted to be redeveloped and thus made visible to the eye and to the camera so that an artist can redevelop such portions of the impregnating image as he may determine, thus bringing into view and putting into combination with a superficial drawing on such surface embellishments made up of visible redeveloped portions of the normally invisible blanched impregnating image.

My newly discovered method of producing camera copy is also broadly new, basic and pioneer in that I first impregnate a surface with a visible photographic image, then blanch said image so that the surface will appear white, then apply a superficial image to such white surface and then apply a developing agent to a portion or portions of the blanched surface, thereby redeveloping such portion or portions of the impregnating image as it may be desired to bring into combination with the superficial image to constitute the camera copy.

A broadly new, basic and pioneer feature comprises the use of an image developing agent on an invisible impregnating image in a surface t bring such image into combination with a visible superficial image thereon for the purpose of producing camera copy.

I have discovered that it is possible to change a photographic image on silver print paper so, that such image becomes invisible to the eye and is not photographically effective through a lens, and yet is capable of redevelopment so as to become both visible to the eye and photographically effective through a lens.

I have also discovered that the medium comprising the impregnating image, and the surface containing the same, is resistant to ordinary daylight, camera electric light, and practically to any light except direct sunlight, and will remain for an indefinite period of time in good condition for use in making camera copy in accordance with this invention, and that it will retain its quality and effectiveness under direct sunlight for a number of hours.

An object of this invention is to reduce the time, labor and expense heretofore required to produce copy for combination line and half-tone or Ben Day stipples and tints, also to avoid necessity of double printing of negatives and separate copies; making all in one exposure and to avoid the time loss heretofore involved in outlining and highlighting half-tones and stipples and the like by machine and hand work, and to produce by simple application of a reproducing agent, any effects that could be produced by drawing in any part or parts corresponding in type to the original copy, and without smudging or offsetting.

In my discovery and invention, all that is necessary to produce the camera copy is to first produce a negative image of any lines, screen, stippling, dots or the like, and from such negative make a silver print, then fix the silver print so that it will be practically permanent, then apply a suitable blanching agent that will not destroy the impregnating image, thus practically restoring to the silver print paper its original white surface, but retaining the image potentially, then applying to such surface the drawing for the copy, and then by the application of a suitable agent, redeveloping such parts or portions of the potential image as may be required to give the desired background or shading effect, or to join other parts of the original copy.

I have discovered that the photographic image produced on the silver print paper may be so blanched by the application of a saturated solution of bichloride of mercury as to become invisible to the eye and of no effect to the camera, while a potential image remains chemically perfect for redevelopment, and can be brought to visibility by the application of a suitable saturated chemically pure caustic solution.

An object is to produce camera copy of superior character at minimum cost of time, labor and material.

Other objects, advantages and features of the invention may appear from the accompanying drawings, the subjoined detailed description and the appended claims.

The invention and discovery may be understood by reference to the accompanying drawing.

Figure 1:
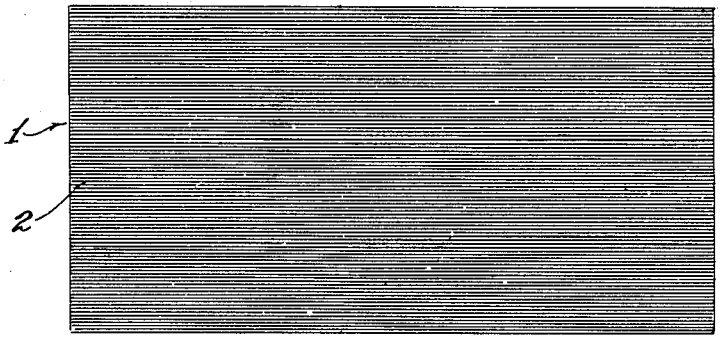
Figure 1 is a view of a surface formed of silver print paper impregnated with or containing a developed photographic image.
Figure 2:
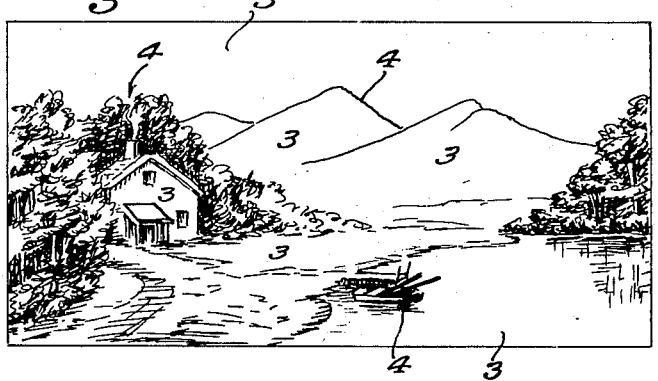
Fig. 2 is a view of the same surface containing potentially the same image invisible to the eye and non-effective before a camera, and also containing a superficial image as an ink drawing which is visible to the eye and is effective before a camera.
Figure 3:
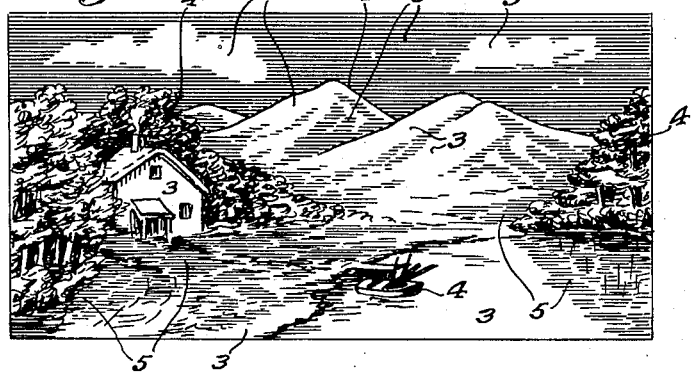
Fig. 3 is a view of the completed camera copy, which consists in the same surface shown in Figs. 1 and 2 and containing the visible superficial image or ink drawing and visible redeveloped portions of said impregnated image and also the undeveloped portions of the non-visible and non-camera effective impregnating image.

1 indicates the surface of a silver print paper sheet and 2 indicates an impregnating developed and visible photographic image suitable for shading or background. 3 indicates the blanched surface in the sheet as shown in Figs. 2 and 3 containing a potential but invisible image or chemical print corresponding in configuration to the developed print 2 in Fig. 1. 4 indicates a superficial visible ink drawing applied by any suitable mechanical means, as by the hand of a draftsman, to the blanched surface 3. 5 indicates portions of the image shown in Fig. 1 that have been redeveloped for background and shading.

It is understood that the camera copy shown in Fig. 3 may be produced in various ways; the principal being that the superficial drawing shown in Figs. 2 and 3 is applied to the blanched surface that contains the chemically applied invisible potential impregnating image and that after the superficial drawing has been applied, the portions desired or required as shading or back-ground to embellish such drawing or the surface upon which the ink drawing has been placed, is redeveloped by the artist by suitable application.

It is understood that if the surface 3 shown in Fig. 2 were printed with a chemical that can be given a photographic value by the application of any kind of developing agent, that my newly invented camera copy would be effectively produced whether the non-acting image was produced by a chemical applied by printing press or otherwise and whether the reproduction were made by pure water or a chemical solution.

I will now describe the method I at present deem most effective and satisfactory for producing my novel camera copy.

That is to say, I first produce upon silver print paper either manufactured by myself or obtained in the open market, a photographic print of the image or configuration as at 2 with which the embellishment of the drawing is to be effected. It is understood that such photographic image may be produced by photographing any surface exhibiting the desired image, as for example, a sheet containing ink linings, a calico or other print, or any image produced by a half-tone or full-tone process. The photographic image thus produced on the silver print paper is then developed and fixed under ordinary photographic process, then the surface is treated to a solution of bichloride of mercury; a saturated solution being found most desirable. This is done in the presence of the actinic rays of light and completely blanches the surface as far as can be discerned either by the eye or by a photographic camera. The sheets provided with such blanched surface constitute the commercial medium to be placed in the hands of the draftsman or other artisan who is to apply to the surface of such sheet the ink drawing or other superficial visible image.

The superficial image may be applied to the surface either by pen, air brush, press or other suitable form of mechanism or instrument.

The drawing or superficial image thus applied must be of a character practically insoluble in the redeveloper which the artist will now apply; and for the surface just described, the redeveloper preferably consists of a saturated solution of caustic soda.

Such solution may be produced by dissolving in water the common concentrated lye of commerce.

The camera copy thus produced is practically permanent so far as determined by the experiments I have made, except that when exposed to the direct rays of the sun for a number of hours, the blanched image will show more or less development, but with ordinary or reasonable care the medium will keep for an indefinite time.

It will be understood that the development of the invisible print by the new method differs from the ordinary methods of photography in a general way in that the caustic soda is applied to the prepared surface by merely placing it in contact with the surface and does not stain the print and does not have to be washed to eliminate surplus chemicals and therefore the work is produced much more quickly and in an altogether different manner from any heretofore known photographic process.

In applying the caustic solution, the artist may use a pencil of white felt with perfect freedom from any likelihood of chemical interferences; or caustic solution may be used in pen or ruling pen, in the same manner as ink is applied to any white surface.

I claim:—

1. The method of producing camera copy for reproduction, which consists in making a drawing upon a surface upon which is imposed an invisible print adapted to be chemically developed for photographic purposes, and then developing such portion or portions of such print as may be required in the proposed camera copy for photographic reproduction.

2. The method of producing camera copy for reproduction, which consists in preparing a photographic print, blanching the photographic image thereon; making an image on the blanched surface and redeveloping one or more parts or all of the blanched image so that the surface will present for camera copy a photographic subject composed of a redeveloped image and an image of an independent character.

3. Camera copy for photographic reproduction consisting of a surface containing in combination, mechanically produced line drawings and chemically developed half tone tints, stippling, shading or the like.

4. Camera copy consisting in a surface containing in part, a visible impregnating image, and a visible superficial image; the visible impregnating image being a development of part or parts of an invisible impregnating image; the superficial drawing combining with the visible impregnating image to constitute the copy from which, outline combination, high lighted, half tone and line negatives can be produced in one negative at a single exposure.

5. A medium for use in the operation of making camera copy, which consists in a surface impregnated with a blanched image invisible, to the eye and to the camera and adapted to be developed and thus made visible to the eye and to the camera and adapted to receive a superficial image so that an artist can at will redevelop such portions of the impregnating image as may be desired as an accompaniment to the superficial image.

6. The method of producing camera copy which consists in making from a negative, a silver print; fixing the silver print so that it will be practically permanent; applying a suitable blanching agent that will not destroy the impregnating image, thus practically restoring to the silver print paper its original white surface but retaining the image potentially; applying to such surface an image and afterward applying a suitable agent and thereby redeveloping such parts or portions of the potential image as may be required to give the desired background or shading effect or to join other parts of the original copy.

7. The method set forth which consists in producing on silver print paper a photographic image, that may be blanched by the application of a saturated solution of bichloride of mercury, blanching such image so as to make the same invisible to the eye and of no effect in the camera, and yet having the potential image chemically perfect for redeveloping, so that subsequent application of a suitable caustic solution to any part of the image will redevelop the photographic image at such part or parts.

8. In the art of producing camera copy, the process which consists in blanching a photographic image to provide a potential image invisible to the eye and of no effect to the camera, then making a drawing on the surface so treated and then bringing to visibility the potential image.

In testimony whereof, I have hereunto set my hand at Los Angeles, California, this 15th day of July, 1927.

HENRY M. BAKER.